US011151552B2

United States Patent
Levy et al.

(10) Patent No.: US 11,151,552 B2
(45) Date of Patent: Oct. 19, 2021

(54) METHOD AND SYSTEM OF BILLING FOR CHARGING A VEHICLE BATTERY LEVERAGING A SINGLE CONNECTION ACTION

(71) Applicants: Paul S. Levy, Albuquerque, NM (US);
Edward Butler, Gilbert, AZ (US);
John C. Thomas, Beaverton, OR (US)

(72) Inventors: Paul S. Levy, Albuquerque, NM (US);
Edward Butler, Gilbert, AZ (US);
John C. Thomas, Beaverton, OR (US)

( * ) Notice: Subject to any disclaimer, the term of this patent is extended or adjusted under 35 U.S.C. 154(b) by 0 days.

(21) Appl. No.: 16/946,760

(22) Filed: Jul. 6, 2020

(65) Prior Publication Data

US 2020/0342506 A1 Oct. 29, 2020

Related U.S. Application Data

(63) Continuation of application No. 12/605,319, filed on Oct. 24, 2009, now abandoned.

(51) Int. Cl.
*G06Q 20/38* (2012.01)
*G06Q 30/04* (2012.01)
*G06Q 50/06* (2012.01)
*G06Q 20/40* (2012.01)
(Continued)

(52) U.S. Cl.
CPC ....... *G06Q 20/3821* (2013.01); *G06Q 20/388* (2013.01); *G06Q 20/3829* (2013.01); *G06Q 20/409* (2013.01); *G06Q 20/4097* (2013.01); *G06Q 30/0207* (2013.01); *G06Q 30/04* (2013.01); *G06Q 50/06* (2013.01);
(Continued)

(58) Field of Classification Search
CPC .. H04L 2209/80; H04L 2209/84; G06Q 30/04
See application file for complete search history.

(56) References Cited

U.S. PATENT DOCUMENTS

| 2009/0184689 A1* | 7/2009 | Kressner | G01R 22/063 320/162 |
| 2010/0049396 A1* | 2/2010 | Ferro | B60L 53/62 701/31.4 |

(Continued)

FOREIGN PATENT DOCUMENTS

| EP | 2099002 A1 * | 9/2009 | ........... G07F 15/003 |
| GB | 2438979 A * | 12/2007 | .............. B60L 53/64 |
| WO | WO-2020053901 A1 * | 3/2020 | ....... B32B 17/10972 |

OTHER PUBLICATIONS

R. H. McClanahan, "Electric deregulation impacts on metering, billing and customer information systems," 2001 Rural Electric Power Conference. Papers Presented at the 45th Annual Conference (Cat. No. 01CH37214), 2001, pp. A1/1-A1/8, doi: 10.1109/REPCON. 2001.949509. (Year: 2001).*

*Primary Examiner* — Jacob C. Coppola

(57) ABSTRACT

A method and system provided for a single-action with which the customer places an order and receives goods by the single action of connecting an electrical vehicle (EV) to a charging station according to the business terms associated with this invention, the affiliated organizations that purchase or support the operation of the invention participate in a business "franchise" operation whereby all affiliated organizations increase their revenues as the volume of EV charging events increases.

7 Claims, 4 Drawing Sheets

(51) Int. Cl.
*G06Q 30/02* (2012.01)
*H04L 9/32* (2006.01)
(52) U.S. Cl.
CPC ............ *H04L 9/32* (2013.01); *H04L 2209/56* (2013.01); *H04L 2209/80* (2013.01); *H04L 2209/84* (2013.01)

(56) References Cited

U.S. PATENT DOCUMENTS

| | | | | |
|---|---|---|---|---|
| 2010/0114798 | A1* | 5/2010 | Sirton | B60L 53/64 705/412 |
| 2010/0156349 | A1* | 6/2010 | Littrell | G07F 15/005 320/109 |
| 2010/0161165 | A1* | 6/2010 | Basir | B60L 53/14 701/22 |
| 2010/0161482 | A1* | 6/2010 | Littrell | B60L 53/68 705/40 |
| 2010/0228415 | A1* | 9/2010 | Paul | G06Q 50/28 701/22 |
| 2010/0274690 | A1* | 10/2010 | Tate, Jr. | B60L 11/1824 705/30 |
| 2010/0315197 | A1* | 12/2010 | Solomon | G06F 21/31 340/5.2 |
| 2011/0153474 | A1* | 6/2011 | Tormey | B60L 53/65 705/31 |
| 2011/0191265 | A1* | 8/2011 | Lowenthal | G06Q 30/06 705/412 |

* cited by examiner

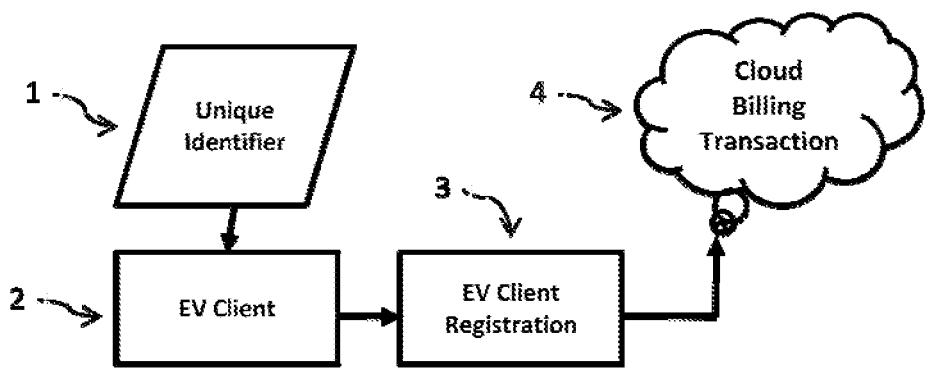
Figure 1: EV Client Identifier/Cloud Registration
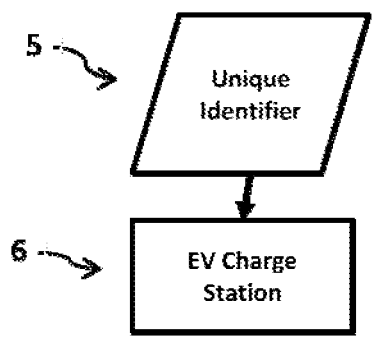
Figure 2: EV Charge Station Identifier
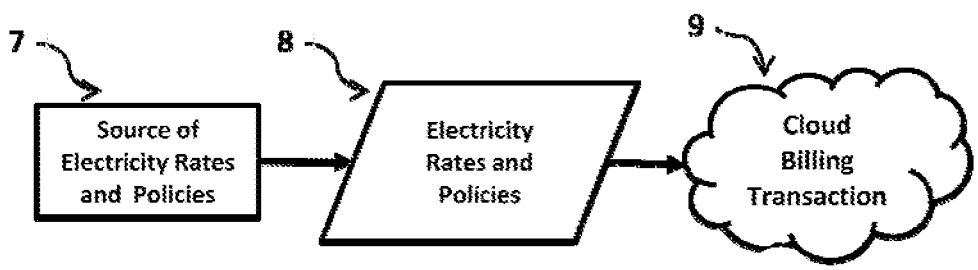
Figure 3: Electricity Rates and Policy Update Process

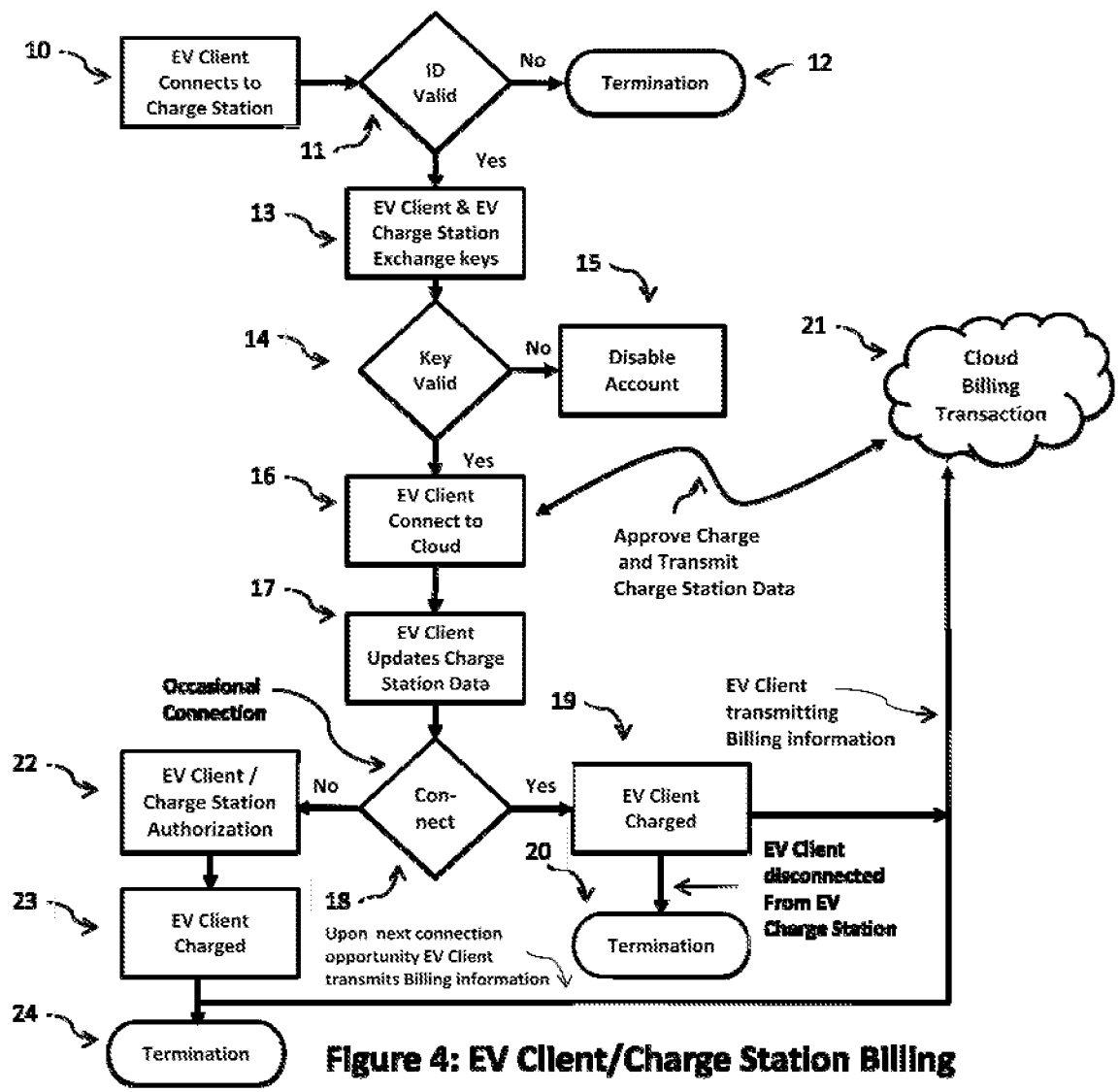

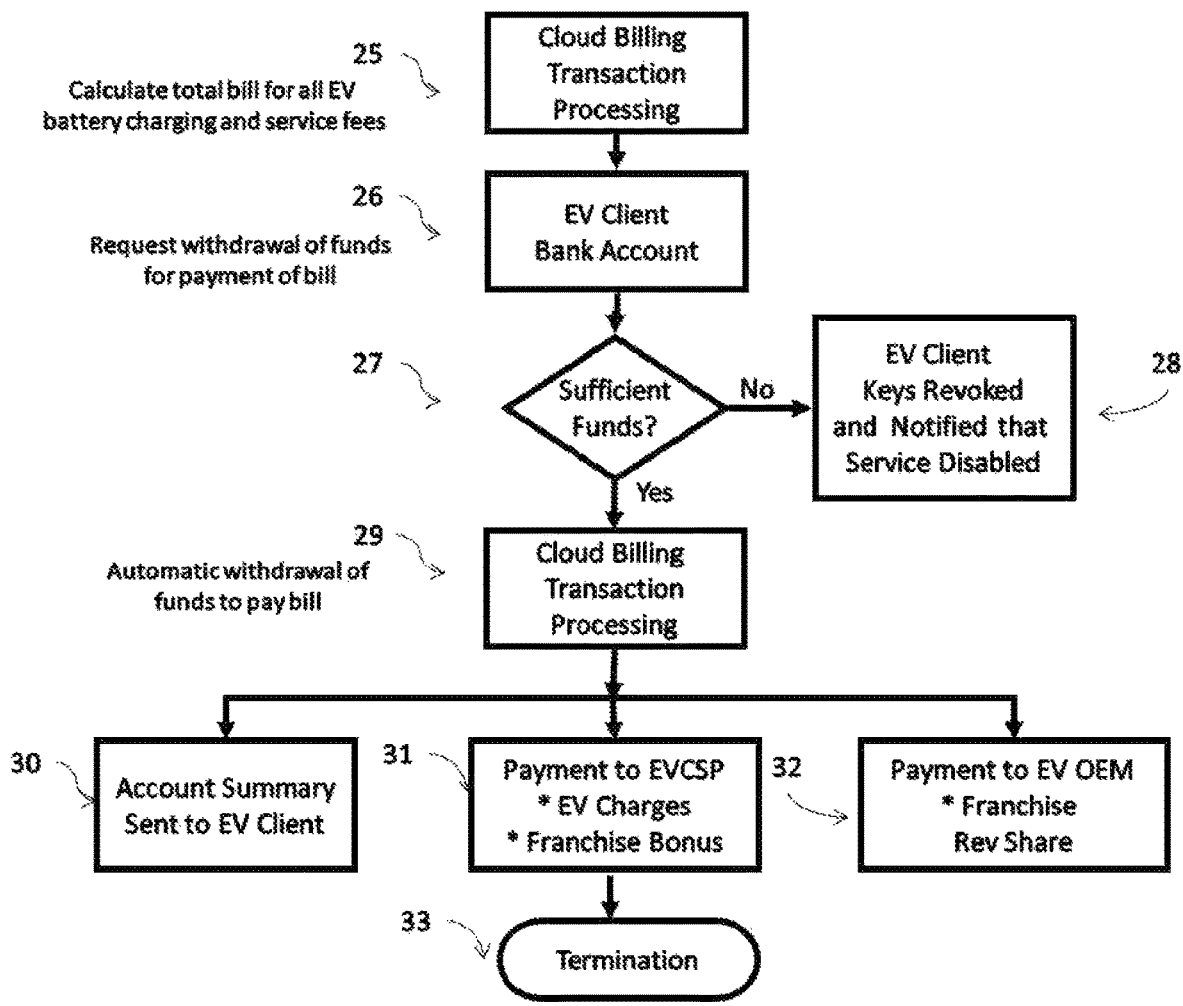
Figure 5: Cloud Billing Process

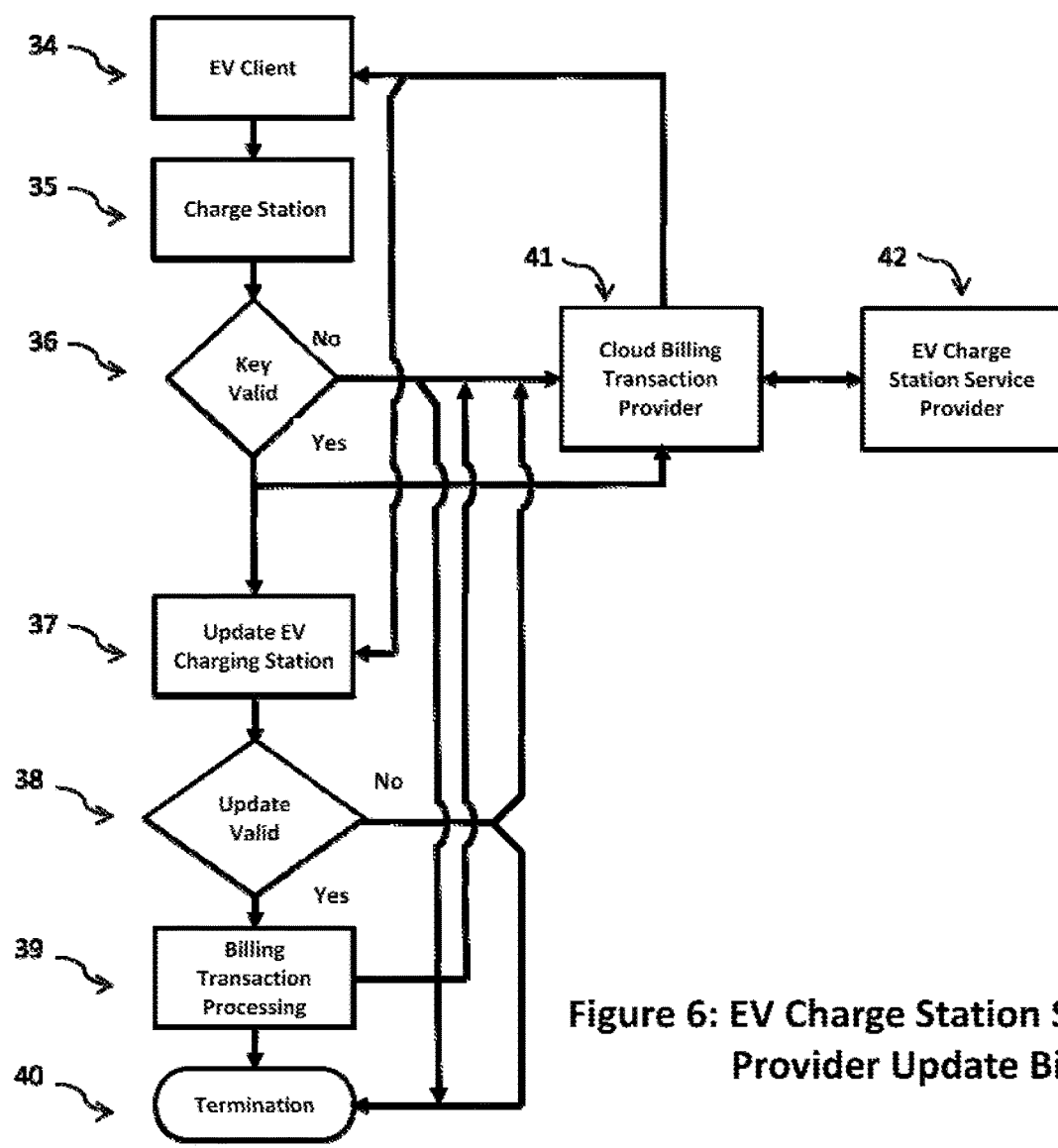
Figure 6: EV Charge Station Service Provider Update Billing

METHOD AND SYSTEM OF BILLING FOR CHARGING A VEHICLE BATTERY LEVERAGING A SINGLE CONNECTION ACTION

CROSS REFERENCE TO RELATED APPLICATIONS

This Application claims the benefited of our earlier filled provisional application titled: Method and process of administrating recharging of electric vehicles using low cost charge stations filed on Oct. 9, 2009 and filled provisional application titled: Method and Process of billing for goods leveraging a single connection action filed on Oct. 9, 2009.

FIELD OF THE INVENTION

The present invention relates to a single-action fully automated method and system for placing an order and delivering goods leveraging pre-arranged agreements over the Internet (or other networks) and enabling multiple parties to share in the revenues generated from the sales of said goods.

BACKGROUND OF THE INVENTION

The rising cost of hydrocarbon based fuels and environmental factors will require a massive transformation of society's transportation infrastructure from fossil fuel to electricity as the primary means of powering vehicles. As electrical vehicles (EV) enter mass production a new infrastructure that consists of numerous, conveniently located electrical charging stations will be required such that drivers can reliably re-charge their EV's batteries while away from home. Furthermore, EV battery charging technology that is simple to use (i.e. does not require human supervision nor the use of cash, credit cards, debit cards, and/or digital "smart" cards) and least costly to manufacture, install, and maintain (because it is not burdened with network communications technologies) is most likely to achieve wide-spread adoption. Such charging stations will enable the EV driver to experience the same ease of re-charging their EV remotely that they experience while re-charging at home, with the convenience of having the electricity cost for all EV re-charging (whether done at home or away from home) charged to a credit account, consolidated onto the regular monthly invoice, or automatically deducted from a bank account of their choice. The introduction of EV charging technology will require inherent business risks on the part of the manufacturers of EVs and the owner operators of EV charging facilities. Because of these risks, the EV charging technology which offers such entities the opportunity to establish a business "franchise" based on fees associated with EV charging events is most likely to be adopted. The combined attraction of such EV charging technology for EV owners (for convenience), EV charge service providers (for the for the cost of ownership of the charging technology) and EV Manufacturers and EV charge service providers (for the business value offered by the "franchise") would create the greatest likelihood for accelerated adoption of this technology in the market.

SUMMARY OF THE INVENTION

The objective of this invention is to provide a method that in response to a Single Action Event; initiates, establishes, and completes an end-to-end transaction based solution for charging Electric Vehicles via networked connected infrastructure.

The Single Action Event occurs when an Electric Vehicle is coupled to an Electric Vehicle Charging Station. This coupling initiates an automated sequence of events that encompasses consumer and charging service provider identification and authorization, utility company electricity rates and policy, cost assessment of services rendered, method of payment via electronic billing transaction, and distribution of billing fees across interested parties such as Electric Vehicle Manufacturers and Charging Station Service Providers etc.

Consumer and charging service provider identification and authorization collateral is determined via prearranged agreements. Said agreements and contracts are individually established between interested parties where identification and authorization data is collected, secured, and is used in the end-to-end Electric Vehicle charging transaction based solution.

Utility Company electricity rates and policy are dynamically accessed and implemented "real-time" to calculate and determine the exact electricity rates and policy during the active charge cycle for billing fee determination.

Method of payment via electronic billing transaction, and distribution of billing fees across interested parties such as Electric Vehicle Manufacturers and Charging Station Service Providers etc is predetermined via agreements. When the Electric Vehicle charging cycle terminates billing information and fees are registered and interested parties accounts are modulated accordingly The Single Action Event is not limited to having an internet and/or network connection at the immediate time the Electric Vehicle connects to an Electric Charging Station having charging services rendered. Intelligence is comprehended and built-in to "store and forward" relevant information when a network connection is eventually established. This store and forward capability establish a uniqueness that allows the Electric Vehicle Charge Stations to be placed in locations where a network connection may not be feasible thus allowing the Electric Vehicle to "Roam" and attaining a charge anywhere there is a Utility Company service available, i.e. power lines In summary, the invention provides a method that on a Single Action Event establishes an end-to-end infrastructure and billing environment that seamlessly allows Electric Vehicles and consumers to charge vehicles without complexity and enables Electric Vehicle "roaming" flexibility In other aspects, the invention provides a system and method having features and advantages corresponding to those discussed above

BRIEF DESCRIPTION OF THE DRAWINGS

Having thus described the invention in general terms, reference will now be made to the accompanying drawings, which are not necessarily drawn to scale, and wherein:

FIG. 1 Shows a flow chart outlining unique identifier of the client to the billing system.

FIG. 2 Shows a flow of a unique identifier associated with the EV Charging Station.

FIG. 3 Shows a flow chart which associates the rate schedule for power to the billing system.

FIG. 4 Shows a flow chart detailing the process of associating the Client ID with the Charge Station and sending the charge amount to the Billing System.

FIG. 5 Shows a flow chart detailing the process of calculating the Charging Station bill and recovering payment from the Client.

FIG. 6 Shows a flow chart detailing updating the Charge Station with updated billing information.

DETAILED DESCRIPTION

The present invention provides a method and system for a single-action ordering method based on pre-arranged agreements between the electric vehicle owner and service provider (electric power utility and/or third party charging service) to charge the vehicle leveraging integrated client and Internet server environment. The single action is the connection of the electrical vehicle (EV) to a charging station. The single-action ordering system of the present invention reduces the number of purchaser interactions needed to place an order and reduces the amount of sensitive information that is transmitted between a vehicle client system and an Internet server authentication system. In one embodiment, the vehicle client is assigned a unique vehicle client identifier and is unique to each vehicle client system. The server system also stores purchaser-specific and vendor-specific billing information which is used for remote billing for services rendered. The server system maps each client identifier to a purchaser which is mapped to the billing account. Along with the order information, a unique identifier of the vendor is also sent so to the billing server so the client is mapped to the vendor and the vendor's electricity rates and policies in order to process billing.

The single action ordering method is initially enabled when a consumer purchases an EV vehicle. The EV vehicle, when consumer owned, is referred to as the EV Client in the following figures.

Referring to FIG. 1 (EV Client Identifier/Cloud Registration), shows the EV Client being assigned a unique identifier. The unique identifier 1 can be assigned to the EV Client 2 prior or post delivery to the consumer. A Public/Private Key pair is also assigned to the EV Client. Upon consumer EV Client ownership, the EV Client unique identification and relevant consumer billing information are registered, 3, with a billing transaction service provider 4.

Referring to FIG. 2 (EV Charge Station Identifier), shows a relative unique identifier 5 being assigned to an EV Charge Station 6. This unique identifier is utilized when the EV Client is connected to the EV Charge Station and is used during the billing transaction process as shown in FIG. 3 (EV Client/Charge Station Billing). A Public/Private Key pair is also assigned to the EV Charge Station during this step (FIG. 2 (A)).

Referring to FIG. 3 (Electricity Rates and Policies Update Process), shows the process through which a source of electricity rates and policies 7, such as an electric power utility, an EV Charge Service Provider (EVCSP), or other entities transmit current electricity rates and policies 8 to the Cloud Billing Transaction Service 9. The rates component of the Electricity Rates and Policies 8 can be static price schedules (such as fixed rates or time-of-use schedules) which are transmitted infrequently, i.e. only when these schedules change. Rates might also include dynamic price signals (such as critical peak pricing) which are only transmitted for specific days and timeframes, for example, when the electric utility is experiencing an excessive demand for electricity. Pricing policies might include any number of policies which might be applied according to local government regulations, for example, restricting the amount of charge that might be provided during critical peak periods.

Referring to FIG. 4 (EV Client/Charge Station Billing), shows the process for authenticating the EV client prior to charging the EV and enabling the charging transaction to occur. The EV Client is connected to the EV Charge Station 10. The EV client checks for the charging station ID to determine if it is compliant with the invention 11. If the charging station is not compliant to the single-action ordering system of the present invention (for example, if charging in the EV owner's home) then the EV billing module is not engaged and the billing process is terminated 12 and charging of the EV client can resume. If the charging station is compliant, a connection is achieved and both units exchange public key information 13 and initiate a validation procedure 14. If key validation process fails the EV Client transaction is disconnected from the EV Charge Station, the EV Client account is disabled, and all processing is terminated 15. If the key validation process is successful 14 a connection between the EV Client and the billing transaction service provider is established 16 to update and exchange electricity consumption related information such as charge station ID, kilowatts consumed, current policy and rates, etc. The EV client in turn updates the stored rates and policy information (previously stored in the Cloud Billing Transaction Service as described above in FIG. 3) in the charging station 17. The EV Client checks to see if it still has a connection to the billing transaction service provider 18. If it does the EV Client battery is charged 19. Upon charge completion the EV Client disconnects from the EV charge station 20 and communicates all data relevant to assessing fees for service rendered to a billing transaction service provider 21. Should the EV client and the billing transaction service provider lose their connection, the EV client continues to reestablish its connection until all billing data is transmitted. Upon services rendered the EV Client is disconnected from the EV Charge Station, 18.

Instances may arise where a connection to a billing transaction service provider cannot be initiated (referred to as an "Occasional" connection) or fully maintained through completion during a real time EV Client/EV Charge Station exchange 18. In such cases the EV Client and EV Charge station will authorize charging services up to a predetermined credit limit 22 and the EV Client will be charged 23. All associated data and billing information will be cached within the EV Client and the Charge Station. Upon next connection availability, the EV Client 23 will transmit the cached data to a billing transaction service provider 21 and the process will be terminated 24. Additionally any successful future Charge Station connection with the billing system will cause the cache to be transmitted for transaction billing.

Referring to FIG. 5 (Cloud Billing Process), outlines the process for billing an EV Client for service rendered and making "franchise" payments to the EV Charge Station and EV OEMs. The Cloud Billing Transaction service 25 calculates the total bill for all EV Client billing for a given period of time. The bill includes battery charging services and processing fees. (The terms for billing period and processing fees are established with the EV Client upon ownership of the vehicle.) At the pre-arranged billing period the Cloud Billing Transaction service attempts to automatically withdraw the calculate fees from the EV Client bank account 26. Note that this withdrawal can be sourced from any type account, i.e. not limited to a bank account, e.g. an account established with the Billing Transaction Provider or any other mutually agreed to source. The EV Client bank 27 determines if there are sufficient funds to make payment. In the event of insufficient funds to make payment and an alternate payment method is not available (such as a credit card) the Cloud Billing Service revokes the Public Keys and or unique identifier of the EV Client and the EV Client is notified that service is disqualified 28. If there are sufficient funds 29 the Cloud Billing Transaction service withdraws funds from the EV Client Bank account then issues a billing statement 30 to the EV Client, issues payment to the EV Charge Station Service Provider (EV CSP) 31, and issues a payment to the EV OEM (Original Equipment Manufacturer) 32. The payments to the EV CSP and EV OEM include Franchise revenue sharing payments that are calculated as a percentage of the battery charging transaction value or per event transaction fees as defined by pre-arranged agreements between all associated parties.

FIGS. 1, 2, 3 and 4 show a method of which the customer places an order and receives services rendered; a complete service is transacted by the single action of connecting the charging station to an electrical vehicle. The action of physical connection (single action) starts an end-to-end sequence of events that bills the vehicle owner for the charging event, remits payment for services rendered to the EV CSP as well as franchise payment to the EV OEM and EV CSP. Termination of the event is as simple as fully charging the EV batteries or un-plugging the vehicle. Billing is routed automatically to the owner's account via a pre-arranged agreement with the billing transaction provider.

Referring to FIG. 6 (EV Charge Station Service Provider Update Billing), illustrates the process of direct billing a EV Charge Station Service Provider for a local EV Charge Station update. The EV Charge Station can be updated for example with information such as refreshed keys or polled for maintenance statistics or any other related information. The EV Client 34 is connected to the EV Charge Station 35. When connection is achieved using public key encryption, 36 a validation procedure is initiated. If validation fails the connection is terminated 40. Upon validation, the EV Client sends notification to the Cloud Billing Transaction Provider 41 which in turn notifies the specific EV Charge Station Service Provider 42 that an update can occur. The EV Charge Station Service Provider can then send update collateral to the EV Client 34 via the Cloud Billing Transaction Provider link and the EV Charge Station is updated 37. Upon EV Charge Station update complete validation 38 Billing Transaction data processing occurs and the EV Client sends billing information 39 to the Cloud Billing Transaction Provider 41 and notification to the EV Charge Station Service Provider 42 via the Cloud Billing Transaction Provider 41 with acknowledgement. Also upon EV Charge Station update complete validation 38 the EV Client to EV Charge Station connection is terminated 40. In the event of failure of the EV Charge Station update complete validation 38 the EV Charge Station Service Provider is notified and Termination 40 occurs. Upon successful update the EV Client 39 notifies the Cloud Billing Transaction Provider 41 that billing the local EV Charge Station Service Provider 42 for the update transaction can occur and the process is terminated 40.

The invention claimed is:

1. A method of charging an electric vehicle, the method comprising:
   in the electric vehicle, detecting establishment of a connection between the electric vehicle and a charging station, the electric vehicle having previously assigned thereto a unique vehicle client identifier stored in the electric vehicle and associated with a remote billing transaction service, and the charging station having previously assigned thereto a unique charge station identifier stored in the charging station and associated with the remote billing transaction service; and
   in the electric vehicle, and in response to detecting establishment of the connection between the electric vehicle and the charging station:
      receiving the unique charge station identifier from the charging station;
      determining that the charging station is compliant with the remote billing transaction service by checking the received unique charge station identifier;
      in response to the charging station being compliant with the remote billing transaction service, initiating a validation procedure between the electric vehicle and the charging station, wherein initiating the validation procedure includes, in the electric vehicle, exchanging public key information with the charging station;
      in response to the validation procedure being successful, performing a charging operation to charge the electric vehicle from the charging station; and
      initiating a billing transaction for the charging operation, wherein initiating the billing transaction for the charging operation includes: storing billing information associated with the charging operation in the electric vehicle and communicating the billing information associated with the charging operation to the remote billing transaction service;
   wherein the connection is a physical connection and establishment of the physical connection between the electric vehicle and the charging station is a single action made by a user of the electric vehicle that initiates performance of said method without any subsequent action of the user.

2. The method of claim 1, wherein the unique vehicle client identifier is associated with a pre-arranged agreement with the remote billing transaction service and established for the electric vehicle that authorizes payment for charging the electric vehicle from the charging station through the remote billing transaction service.

3. The method of claim 1, wherein the unique vehicle client identifier is associated with consumer billing information registered with the remote billing transaction service for use in completion of the billing transaction by the remote billing transaction service, the consumer billing information including the method of payment to be charged when completing the billing transaction.

4. An electric vehicle, comprising:
   a battery;
   a processing system disposed in the electric vehicle;
   a memory configured to store a unique vehicle client identifier for the electric vehicle, the unique vehicle client identifier associated with a remote billing transaction service, wherein the memory comprises instructions that, when executed by the processing system, cause the processing system to perform a method comprising:
      detecting establishment of a connection between the electric vehicle and a charging station, the charging station having previously assigned thereto a unique charge station identifier stored in the charging station and associated with the remote billing transaction service; and
      in response to detecting establishment of the connection between the electric vehicle and the charging station:
         receiving the unique charge station identifier from the charging station;

determining that the charging station is compliant with the remote billing transaction service by checking the received unique charge station identifier;

in response to the charging station being compliant with the remote billing transaction service, initiating a validation procedure between the electric vehicle and the charging station, wherein initiating the validation procedure includes, in the electric vehicle, exchanging public key information with the charging station;

in response to the validation procedure being successful, performing a charging operation to charge the electric vehicle from the charging station; and initiating a billing transaction for the charging operation, wherein initiating the billing transaction for the charging operation includes: storing billing information associated with the charging operation in the electric vehicle and communicating the billing information associated with the charging operation to the remote billing transaction service;

wherein the connection is a physical connection and establishment of the physical connection between the electric vehicle and the charging station is a single action made by a user of the electric vehicle that initiates performance of said method without any subsequent action of the user.

5. The electric vehicle of claim 4, wherein the steps of receiving the unique charge station identifier, determining that the charging station is compliant with the remote billing transaction service, initiating the validation procedure and performing the charging operation occur while no network connection is established between the electric vehicle and the remote billing transaction service such that the billing information associated with the charging operation is cached in the electric vehicle, and wherein the communicating the billing information from the electric vehicle to the remote billing transaction service occurs after the charge operation between the electric vehicle and the charging station has been completed and after a network connection has been established between the electric vehicle and the remote billing transaction service.

6. The electric vehicle of claim 5, wherein the steps of receiving the unique charge station identifier, determining that the charging station is compliant with the remote billing transaction service, initiating the validation procedure and performing the charging operation occur when the electric vehicle is at a first location where network connectivity between the electric vehicle and the remote billing transaction service is unavailable, and wherein the communicating the billing information message associated with the charging operation from the electric vehicle to the remote billing transaction service occurs when the electric vehicle is at a second location where a network connectivity is available between the electric vehicle and the remote billing transaction service.

7. The electric vehicle of claim 4, wherein the method further comprises receiving data for the charging station communicated from the remote billing transaction service and updating the charging station with the received data while the connection is established between the electric vehicle and the charging station.

* * * * *